Patented Sept. 3, 1935

2,013,040

UNITED STATES PATENT OFFICE 2,013,040

ART OF SOLVENT EXTRACTION OF PETROLEUM DISTILLATES

David F. Edwards and John V. Starr, Elizabeth, N. J., assignors to Standard Oil Development Company, a corporation of Delaware No Drawing. Application March 6, 1931, Serial No. 520,714

5 Claims. (Cl. 196—13)

This invention relates to improvements in the art of solvent extraction of petroleum oils. It is well known that the selectivity of solvents such as are used for the purification of petroleum oils especially burning oil and lubricating distillates, for example, aniline, sulfur dioxide, furfural, etc., varies considerably with the temperature at which the treatment is carried out. On the other hand, it is frequently necessary, because of miscibility relationships with oil, or because of peculiar physical properties of certain solvents, to restrict the temperature to relatively narrow limits, with the result that maximum efficiency of the solvent and yield of a high quality product are not obtained.

This invention relates to the improvement in the art of solvent extraction which comprises employing a blend of certain solvents in such proportions as approach maximum selectivity, by allowing the treatment to be carried out over a wide range of temperature. Certain solvents such as anhydrous phenol are solid at ordinary temperatures. By blending phenol with the solvent herein proposed the blend or mixture is liquid at these temperatures.

The invention will be described for illustration in connection with the use with phenol of 2 to 30% of certain alkyl derivatives of cyclic compounds, for example, cresols (herein referred to as cyclic alcohols) or certain hydrogenated derivatives of cyclic compounds, such as polyhydro cyclic alcohols or polyhydro cyclic ketones (for example cyclohexanol or cyclohexanone). The physical properties of the blend are such that it may be employed in extraction processes over a wide range of temperatures. This removal of the temperature restriction which has attended the use of phenol as a selective solvent, results in the selectivity being greatly increased and a high quality oil is produced with a good yield from a low quality raw distillate. Considerable saving is effected in the cost of installation of suitable equipment for regulating the temperature with narrow limits.

As an example the following table shows a comparison of yield and quality when treating with pure and blended solvents at different temperatures.

Lubricating distillate used

| Percent of solvent used by volume of oil treated | Temperature | Yield | Viscosity index |
|---|---|---|---|
| | ° F. | Percent | |
| 100% of pure phenol | 108 | 77 | 66 |
| 300% of pure phenol | 108 | 52.7 | 90 |
| 100% of a mixture of 90% pure phenol and 10% cyclohexanol | 108 | 74.8 | 86 |
| 100% of a mixture of 90% pure phenol and 10% cyclohexanol | 85 to 90 | 75 | 94 |

The viscosity index used in above table indicates the relationships between viscosity and temperature. A high viscosity index denotes an oil which has little change of viscosity with temperature variations, within normal ranges. This property is valuable in lubricating oils. The term viscosity index is described in Chemical and Metallurgical Engineering vol. 36, No. 10, October, 1929, under the title of Viscosity variations of oils with temperature, by E. W. Dean and G. H. B. Davis.

In the above table it is shown that a high quality oil can be recovered by treatment with less solvent and at lower temperatures.

Various other modifications can be made and it will be understood that the application is not to be limited by the particulars given above but only by the following claims in which it is the intention to claim all inherent novelty of this process as broadly as the prior art permits.

We claim:

1. In the treatment of petroleum oil with a selective solvent for removal as extract of certain constituents of said oil, the improvement which comprises the step of carrying out the treatment with a liquid mixture of phenol and another solvent selected from the class including polyhydro derivatives of phenol having a melting point lower than that of phenol.

2. Process according to claim 1 in which the solvent comprises a liquid mixture of phenol and a polyhydro derivative thereof selected from the class including polyhydro cyclic alcohols and polyhydro cyclic ketones of the type of cyclohexanol and cyclohexanone.

3. In the treatment of petroleum oils with a selective solvent which is normally solid at temperatures at which it has a maximum beneficial effect, the improvement which comprises treating the oil with a substantially anhydrous mixture of said solvent and a sufficient quantity of a cyclic alcohol to render the solvent fluid at such temperatures.

4. In the treatment of petroleum oil with phenol, the improvement which comprises treating the oil with a substantially anhydrous mixture of phenol and a sufficient quantity of a cyclic alcohol to render the phenol liquid at normal temperatures.

5. In the treatment of petroleum oil with phenol for the removal, as extract, of certain constituents of the oil, the improvement which comprises treating the oil with a substantially anhydrous mixture of phenol and a sufficient quantity of cresol to render the phenol liquid at normal temperatures.

DAVID F. EDWARDS.
JOHN V. STARR.